(12) United States Patent
Dube

(10) Patent No.: US 10,370,124 B2
(45) Date of Patent: Aug. 6, 2019

(54) SATELLITE DEPLOYER SPRING METHOD, SYSTEM, AND APPARATUS UTILIZING A BORE CONFORMING HINGED LEAF SPRING CONSTRUCTION

(71) Applicant: QUAD-M, INC., McDade, TX (US)

(72) Inventor: Victor James Dube, McDade, TX (US)

(*) Notice: Subject to any disclaimer, the term of this patent is extended or adjusted under 35 U.S.C. 154(b) by 67 days.

(21) Appl. No.: 15/791,069

(22) Filed: Oct. 23, 2017

(65) Prior Publication Data

US 2018/0194494 A1 Jul. 12, 2018

Related U.S. Application Data

(60) Provisional application No. 62/411,563, filed on Oct. 22, 2016.

(51) Int. Cl.
*B64G 1/00* (2006.01)
*B64G 1/64* (2006.01)

(52) U.S. Cl.
CPC .............. *B64G 1/002* (2013.01); *B64G 1/641* (2013.01); *B64G 1/645* (2013.01); *B64G 2001/643* (2013.01)

(58) Field of Classification Search
CPC .......... B64G 1/64; B64G 1/641; B64G 1/645; B64G 2001/643
See application file for complete search history.

(56) References Cited

U.S. PATENT DOCUMENTS

| | | | | |
|---|---|---|---|---|
| 3,045,779 A | * | 7/1962 | Rosenthai | B64G 1/645 185/37 |
| 2014/0319283 A1 | * | 10/2014 | Holemans | B64G 1/641 244/173.3 |
| 2016/0075452 A1 | * | 3/2016 | Robles | B64G 1/005 244/173.3 |
| 2017/0327253 A1 | * | 11/2017 | Bogdanov | B64G 1/641 |

* cited by examiner

*Primary Examiner* — Richard G Davis
(74) *Attorney, Agent, or Firm* — Hulsey, P.C.

(57) ABSTRACT

A satellite deployer spring mechanism includes a satellite deployer enclosure for containing an associated column of hinged spring element sets. A pair of identically-sized leaf springs each including a sheet of curved metal formed into an approximately rhomboidal shape with opposing acute angles trimmed to form opposing parallel sides. The identically-sized leaf springs are pivotally hinged at the opposing parallel sides to form a compressible and opposing pair of leaf springs as a compressible elliptical leaf spring pair. Each of the identically-sized leaf springs further includes an alignment aperture at the center of the approximately rhomboidal shape for receiving a retention screw, such that the compressible elliptical leaf spring pair may receive a retention screw, thereby forming the hinged leaf spring assembly in a compressed state prior to deployment.

20 Claims, 4 Drawing Sheets

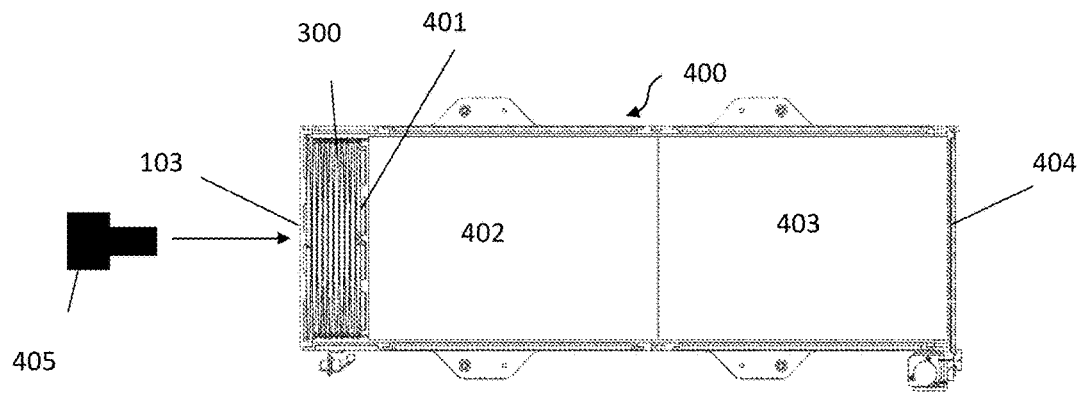
FIG. 5
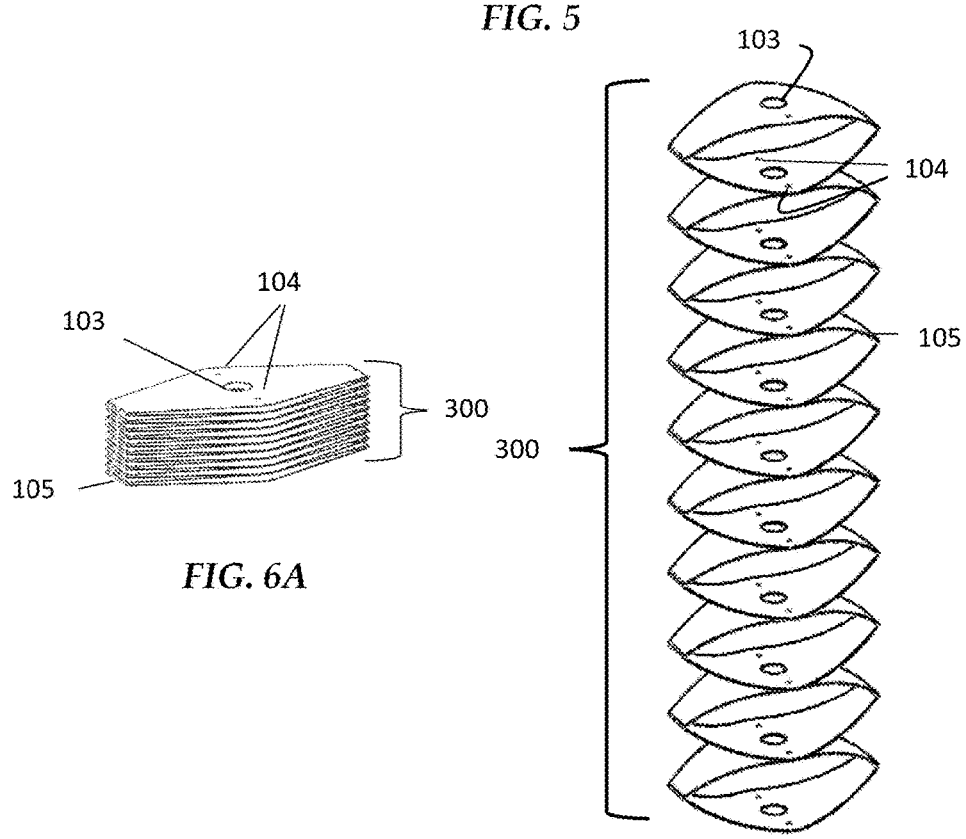
FIG. 6A
FIG. 6B

SATELLITE DEPLOYER SPRING METHOD, SYSTEM, AND APPARATUS UTILIZING A BORE CONFORMING HINGED LEAF SPRING CONSTRUCTION

CROSS-REFERENCE TO RELATED APPLICATIONS

This application claims the benefit of the following provisional and non-provisional applications, all of which are here expressly incorporated by reference:

62/411,563 entitled "SATELLITE DEPLOYER SPRING," filed on Oct. 22, 2016,

Ser. No. 15/394,588 entitled "DOOR MECHANISM FOR SATELLITE DEPLOYER SYSTEM," filed on Dec. 29, 2016; and Ser. No. 14/445,271 entitled DOOR MECHANISM FOR SATELLITE DEPLOYER SYSTEM," filed on Jul. 29, 2014.

FIELD OF THE DISCLOSURE

This disclosure relates generally to a satellite deployer spring system and method utilizing a bore conforming hinged leaf spring construction to prevent spring buckling for more efficient deployment of payloads into space and the method of its use. More specifically, the present disclosure delineates a satellite deployer spring utilizing a bore conforming hinged leaf spring construction for use on a satellite deployer designed to store, transport, and deploy miniaturized satellites.

BACKGROUND OF THE DISCLOSURE

For the purposes of interpreting the disclosure made herein, the terms "CubeSat deployer", "satellite deployer", "satellite deployer system", or derivations thereof are used interchangeably and should be considered synonymous. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Commercial development outside the earth's atmosphere, i.e., outer space, presents physical and logistics challenges and difficulties, hazards, and costs of a different nature from those within the earth's atmosphere. Because of these challenges and difficulties, satellites have been, and will continue to be the primary means for the clear majority of extra-planetary operations. Satellites have been used to explore space, gather and relay data, perform experiments, and do any other number of tasks.

Picosatellites, including CubeSats, provide a means for minimizing the financial barrier to space entry. The components used to build CubeSats are usually relatively inexpensive, off-the-shelf, electronics. The small size of these CubeSats and other picosatellites coupled with their uniform dimensions and inexpensive components make these satellites an attractive means of accessing space at a relatively small cost.

Miniaturized satellites can simplify problems commonly associated with mass production, although few satellites of any size, other than "communications constellations" (where dozens of satellites are used to cover the globe), have been mass-produced in practice. One reason for miniaturizing satellites is to reduce the cost associated with transporting them into space. Heavier satellites require more energy to transport them into orbit or open space, thereby requiring larger rockets with greater fuel requirements, which results in higher costs. In contrast, smaller and lighter satellites require less energy and less volume (requiring smaller and cheaper launch vehicles) and may be launched in multiples, or in other words, deployed in groups and at the same time. These small satellites, such as CubeSats and other picosatellites, can also be launched in a "piggyback" manner, using excess capacity available on already loaded launch vehicles.

The high cost of transporting mass from the surface of a stellar body into an orbit around a celestial body, or open space, has limited the development of aerospace activity. This high cost per unit mass has made minimizing the mass of the objects being sent into space particularly important. To achieve their purpose, CubeSats must be transported out of the atmosphere and released into space (whether that is into an orbit around a celestial body or into open space). Satellite deployers are used to store and protect satellites during their transportation into space. These satellite deployers protect the payloads stored inside of them from damage caused by the inherent stresses resulting from launching such payloads into space. The satellite deployer must also safely and efficiently deploy their satellite payloads into the correct trajectory once the system has reached space.

California Polytechnic State University ("Cal Poly") initiated the CubeSat concept in 1999, to enable users to perform space science and exploration at lower costs. A basic CubeSat ("1 U") is a 10 cm' cube (one liter in volume) having a mass of not more than 1.33 kg. Other common sizes are available, including a "2U" that is 20 cm×10 cm×10 cm, and a "3U" that is 30 cm×10 cm×10 cm. Other sizes, such as a "6U" (30 cm×10 cm×20 cm), "12U" (30 cm×20 cm×20 cm), and "27U" (30 cm×30 cm×30 cm), have also been proposed, the dimensions cited herein are 'nominal'. The standardized specification of CubeSats also allows for the deployment means of these satellites to be standardized as well. The standardization among both payloads and deployers enables quick exchanges of payloads without the need of customized payload-deployer interfaces. It also allows for easily interchanging parts across similarly dimensioned satellites.

Associated with the minimization of mass is the minimization of volume. This is important in the field of space transportation since there is a finite amount of usable storage volume inside of space vehicles. This minimization of mass and volume is important not only for satellites, but for the systems used to store, transport and deploy the satellites.

Satellite deployers may be designed as metal storage containers into which satellites are placed. These container-type satellite deployers usually provide a door at one end, through which payloads may be loaded and unloaded. After loading, the deployer system's door is sealed, and the deployer system is then mounted onto a launch vehicle which is responsible for transporting the deployer system, including any satellites or other space payloads stored therein, into space. Once the system is in space, the deployer may then be taken through an airlock so that the deployer is in contact with space. Once the deployer is in contact with space, the deployer's door is pointed in the desired direction In a typical scenario, users build a CubeSat to perform a particular task in space, then coordinate with launch service providers to obtain "space-available" allocation on a delivery spacecraft, such as a launch vehicle, a shuttle, or a space station. Because the CubeSats are small, they may often be placed in the spaces between the larger payloads in the delivery spacecraft.

To deploy a CubeSat in space, a dispensing device is used to 'push' the CubeSat away from the delivery spacecraft. This dispensing device is also used to transport the CubeSat and to secure it to the delivery spacecraft. Current dispensing devices include the "P-Pod" (Poly's Pico-satellite Orbital Deployer), designed by Cal Poly, and the ISIPOD deployer, designed by ISIS (Innovative Solutions In Space). The P-Pod deployer accommodates a "3U" CubeSat, or, equivalently, three "1 U" CubeSats, or, one "1 U" CubeSat and one "2U" CubeSat". The ISIPOD is also available in a variety of sizes.

It is well known in prior art that satellite deployers utilize various types of coiled springs to provide separation force between a deployer and a satellite being deployed. In particular, CubeSat satellite Poly-Pico Satellite (P-POD) deployer and other CubeSat deployers, such as the deployer in the applicant's patent application Ser. No. 14/445,271 dated Jul. 29, 2014. These springs are called deployment springs.

The P-POD and similar deployers are designed to carry standard format CubeSats which are stored in the deployer's rectangular outer aluminum box with an electrically activated spring-loaded door mechanism. After an electrical signal is sent from a launch vehicle, the spring loaded front door mechanism is opened and the CubeSat(s) are pushed out by a deployment spring exerting force on a pusher plate which pushes the back of the end CubeSat. The CubeSat(s) slide along guidance rails with the deployer spring force eventually ejecting the CubeSats(s) into orbit with a separation velocity of a few meters per second. The deployer spring utilized in these previous single-wide deployers are long coil springs and are constrained in the square cross section of the deployer's interior volume. When other variations of CubeSat geometry are desired (e.g. a double-wide CubeSat), the geometry of the constraining volume changes which permits the coil spring to buckle which reduces the applied force of the spring over the length of spring travel thus providing a varying and unpredictable deployment spring force to the satellite which is undesirable.

The disclosed subject matter helps to avoid these and other problems.

SUMMARY OF THE DISCLOSURE

The disclosure relates to an improved satellite deployer spring in particular a method and apparatus for using a new and improved spring for ejecting a satellite from a satellite deployer.

According to the teachings of the present disclosure, there is here provided satellite deployer spring mechanism including a satellite deployer enclosure for containing an associated column of hinged spring element sets, a substantial subset of the hinged spring element sets. A pair identically-sized leaf springs each including a sheet of curved metal formed into an approximately rhomboidal shape with opposing acute angles trimmed to form opposing parallel sides. The identically-sized leaf springs pivotally hinged at the opposing parallel sides to form a compressible and opposing pair of leaf springs as a compressible elliptical leaf spring pair. Each of the identically-sized leaf springs further including an alignment aperture at the center of the approximately rhomboidal shape for receiving a retention screw, such that the compressible elliptical leaf spring pair may receive a retention screw, thereby forming the hinged leaf spring assembly in a compressed state prior to deployment. The associated column of hinged spring element sets including a cross sectional shape conforming to the shape of the satellite deployer enclosure. A pusher plate in communication with the associated column of hinged spring element sets. A satellite in communication with the pusher plate, and a release mechanism. The satellite deployer enclosure contains the hinged leaf spring assembly that applies force without buckling to the pusher plate pushing the satellite out of the satellite deployer enclosure after the release mechanism actuation.

The main advantage of using the disclosure is the provision of a novel means of spring construction for providing an improved linear spring force for ejecting a satellite from a satellite deployer.

The disclosure allows construction of a long spring with a customizable cross sectional area conforming to the interior cross sectional area of an arbitrary cross section deployer thus permitting the spring to occupy the entire cross sectional area of the interior of the deployer which prevents the spring from bucking during a long spring stroke extension.

The leaves of the spring are designed such that bending stress is uniform in the outer fibers of each leaf maximizing the efficiency of the spring.

An additional advantage is that the spring is lightweight and simple in construction.

Descriptions of certain illustrative aspects are described herein in connection with the FIGUREs. These aspects are indicative of various non-limiting ways in which the disclosed subject matter may be utilized, all of which are intended to be within the scope of the disclosed subject matter.

Other advantages, emerging properties, and features will become apparent from the following detailed disclosure when considered in conjunction with the associated FIGUREs that are also within the scope of the disclosure.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGUREs and examples are not meant to limit the scope of the present subject matter to a single embodiment, but other embodiments are possible by way of interchange of some or all of the described or illustrated elements and, further, wherein:

FIG. 5 is a pictorial drawing of a composite spring in a compressed state inside of a satellite deployer;

FIG. 6A provides a pictorial drawing of a composite spring in a compressed state;

FIG. 6B depicts a pictorial drawing of composite spring in an expanded state;

DETAILED DESCRIPTION OF ILLUSTRATIVE EMBODIMENTS

Figure 1:
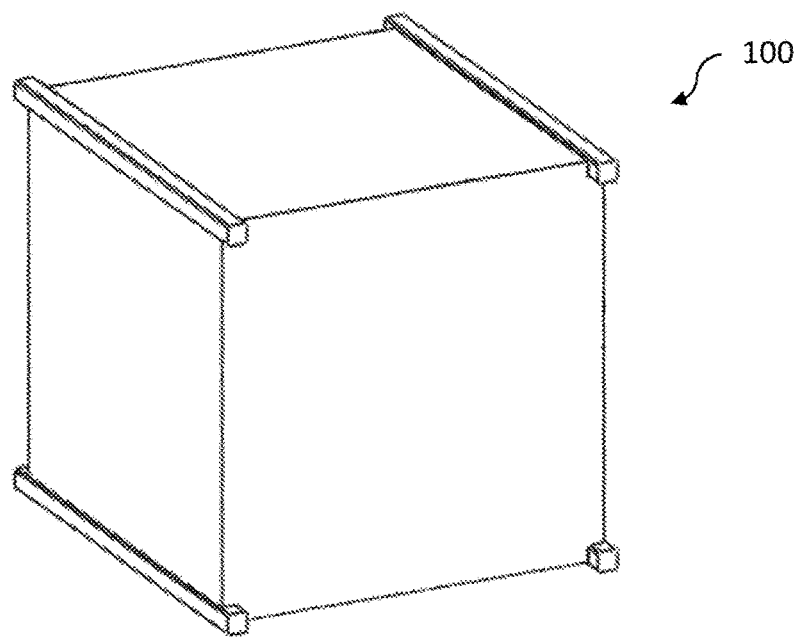
FIG. 1 illustrates an exemplary CubeSat.

The detailed description set forth below in connection with the appended drawings is intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration.

In one embodiment, the apparatus of the disclosure includes fabricating a set of leaf springs (using laser cutting, milling or any other fabrication means well known in the art) from a flat sheet of material (e.g. spring steel, plastic, composite material or any other spring material well known in the art) with a particular flat cross section (that conforms to the desired cross section or bore of the inside volume of the deployer) and forming the flat sheet into a curved element that has a known elastic spring constant. Two single spring elements are attached together with two hinges in similar fashion to an elliptical leaf spring. The hinges may be in a form of a piano hinge, slots and tabs, or other hinging means well known in the art. The piano hinge elements are constructed on two edges of each leaf spring by bending or forming by some means well known in the art. The piano hinge elements on each edge interconnect with an opposing half of another spring element and a pin is inserted into each of the piano hinge elements to connect the leaf spring elements together in a rotating hinge fashion. This is called a hinged spring element set.

Each leaf spring has a central access hole cut in the middle of the flat sheet. In addition, two holes are cut for rivets (or other types of fasteners well known in the art) in each leaf spring that connects each hinged spring element set to another hinged spring element set. Any number of hinged spring element sets can be connected to form a composite spring of any desired length. This spring construction forms a linear force spring with predictable characteristics.

An advantage of this system is that the spring assembly is constrained within the arbitrary cross sectional area of the deployer and cannot buckle like previous long-throw coil springs. When the inventive spring is employed as a deployer spring it provides a reliable, predictable deployment spring in a satellite deployer.

Figure 2:
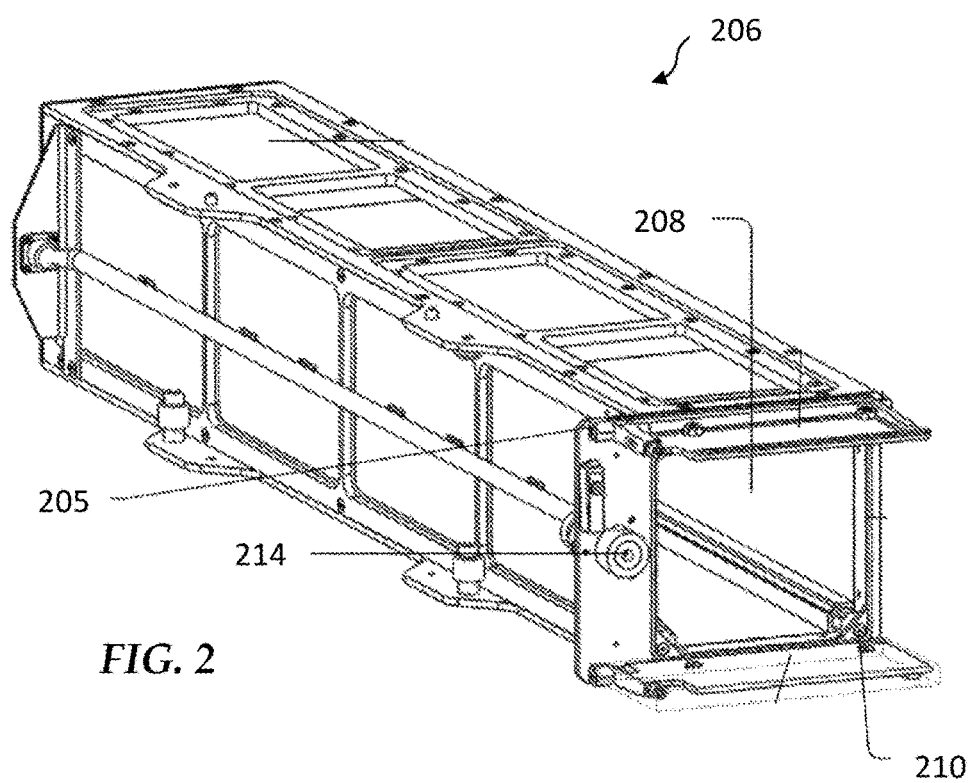
FIG. 2 depicts a deployer system having its door system in an open configuration.

FIG. 1 illustrates a simplified representation of a CubeSat 100, including six external surfaces, including two sides, a top, a bottom, and a back. FIG. 2 depicts an exemplary satellite deployer system with the door system 206 in the open position, wherein the locking mechanism 214 has been disengaged, and wherein the door system 206 has rotated about the hinges 212 approximately 90 degrees from a closed position. The door system 206 has been stopped at this 90-degree open position by having the door edge 210 mechanically engage the frame extension 208. With the door system 206 in a closed position, locking mechanism 214 is engaged and prevent door system 206 from rotating about the hinges 212. Door system 206 depicted in FIGURE includes two doors, each spanning approximately 50% of the open end 202 of the deployer's housing 200.

Figure 3:
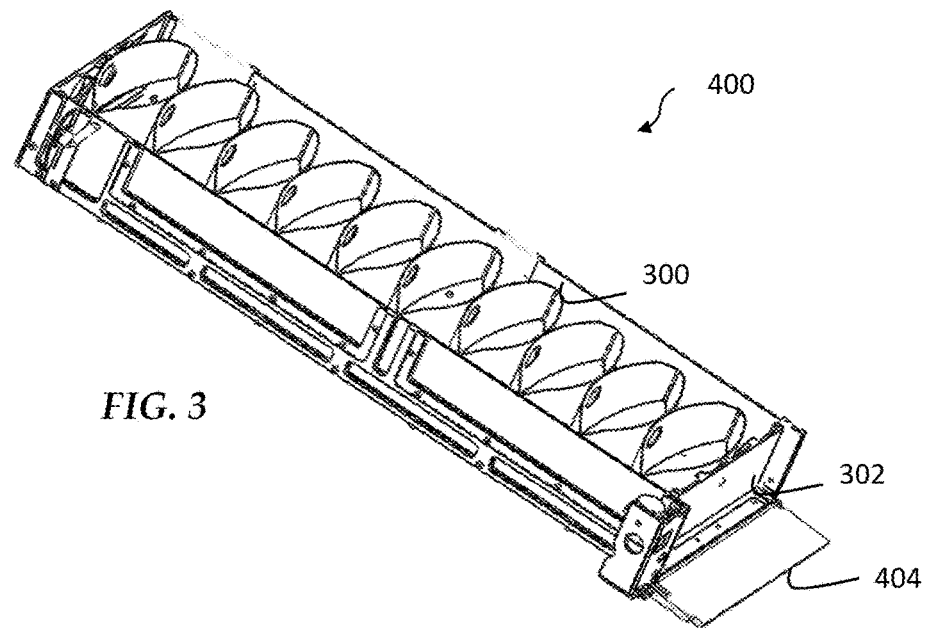
FIG. 3 exhibits an isometric cutaway drawing of a composite spring in an expanded state inside of a satellite deployer.

FIG. 3 exhibits an isometric cutaway drawing of a composite spring in an expanded state inside of a satellite deployer. FIG. 5 is an isometric cutaway view A-A of CubeSat deployer 400 with an expanded composite spring 300, pusher plate 401 and open deployer door 404.

A double wide CubeSat deployer 400 is illustrated in FIGS. 4A, 4B, 4C, and 5 but the composite spring 300 construction permits any sized CubeSat deployer 400 cross sectional geometry (i.e. single wide, double wide, triple wide, etc.) to be utilized since the inventive composite spring 300 is constrained within the deployer walls and is not subject to buckling as is the case in prior art single wide CubeSat deployer long coil springs.

Figure 4A:
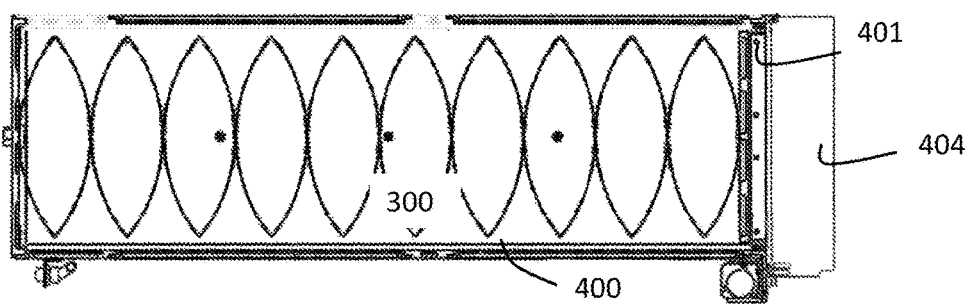
FIG. 4A illustrates a composite spring in an expanded state inside of a satellite deployer.
Figure 4B:
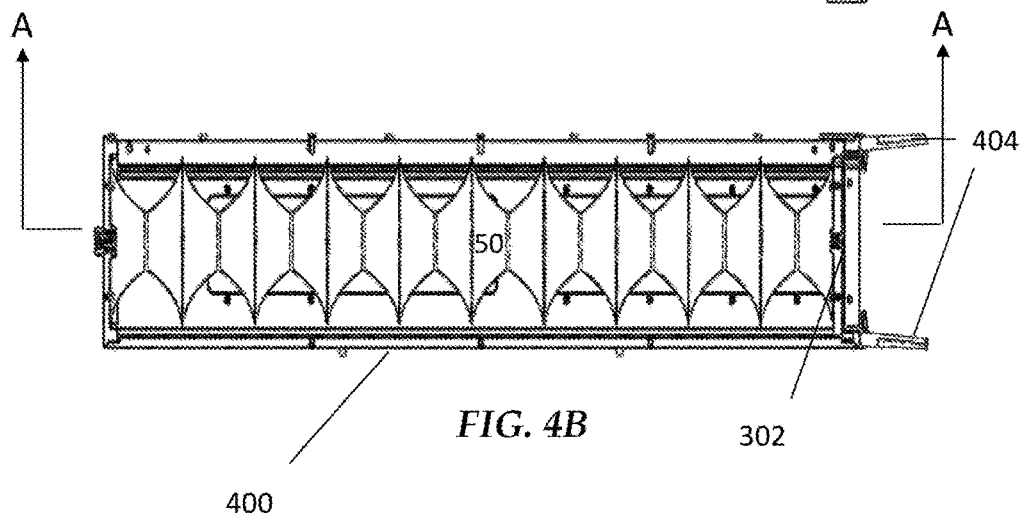
FIG. 4B is a side view drawing of a composite spring in an expanded state inside of a satellite deployer.

FIG. 4A illustrates a composite spring in an expanded state inside of a satellite deployer. FIG. 4B illustrates an expanded composite spring 300 installed inside of a double wide CubeSat deployer 400 after deployment of CubeSats 402 and 403. Pusher plate 401 has been pushed all of the way to the front of CubeSat deployer 400. deployer door 404 is shown in its open state after an electrical command was sent to the release mechanism of deployer door 404 to release the CubeSats 402. FIG. 4C is a side view of CubeSat deployer 400 with an expanded composite spring 300, pusher plate 401 and open deployer doors 404.

Since the spring assembly 300 does not buckle like prior art long-throw coil springs, spring assembly 300 provides a reliable, predictable deployment spring 300 in a satellite deployer 400.

FIG. 5 is a pictorial drawing of a composite spring in a compressed state inside of a satellite deployer. FIG. 5 illustrates a compressed composite spring 300 installed inside of a double wide CubeSat deployer 400. Pusher plate 401 is in communication with the compressed composite spring 300 and the back of the double wide CubeSat 402. An additional double wide CubeSat 403 is in front of the rear double wide CubeSat 402. Deployer door 404 restrains the CubeSats 402 and 403 from deploying until an electrical command is sent to the release mechanism of deployer door 404 to release the CubeSats 402 and 403 that are pushed out of deployer 400 by the force of composite spring 300 applied to pusher plate 401.

Access holes 103 in the composite spring assembly 300 permit retention screw 405 access to pusher plate 401 in the event that pusher plate 401 requires restraint (e.g. during prelaunch activities). Retention screw 405 is generally removed prior to launch of the CubeSat deployer 400.

FIG. 6A provides a pictorial drawing of a composite spring in a compressed state. FIG. 6A illustrates how any number of compressed hinged spring element sets 105 can be connected to form a composite spring 300 of any desired length. This spring construction forms a linear force spring with predictable characteristics. It should be noted that access hole 103 provides a straight-line path through the stack of hinged spring element sets 105.

FIG. 6B depicts a pictorial drawing of composite spring in an expanded state. FIG. 6B illustrates how any number of expanded hinged spring element sets 105 can be connected to form an expanded composite spring 300 of any desired length. This spring construction forms a linear force spring with predictable characteristics. It should be noted once again that access hole 103 provides a straight-line path through the stack of hinged spring element sets 105. Rivet holes 104 are also clearly visible in this illustration.

Figure 7A:
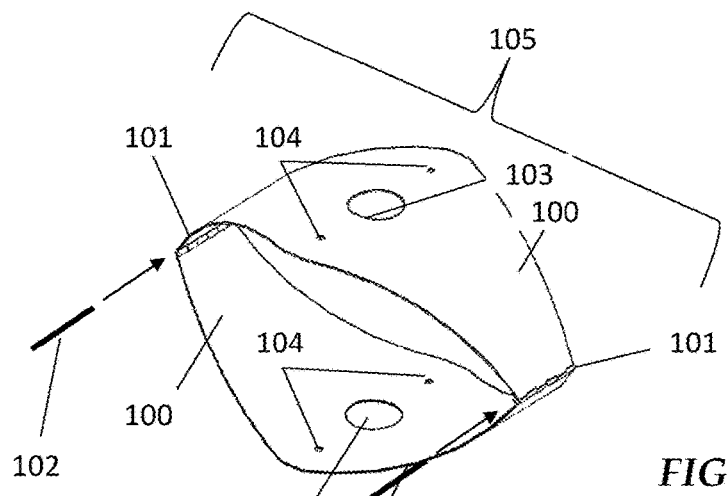
FIG. 7A displays a view of the hinged spring element set in an expanded state.
Figure 7B:
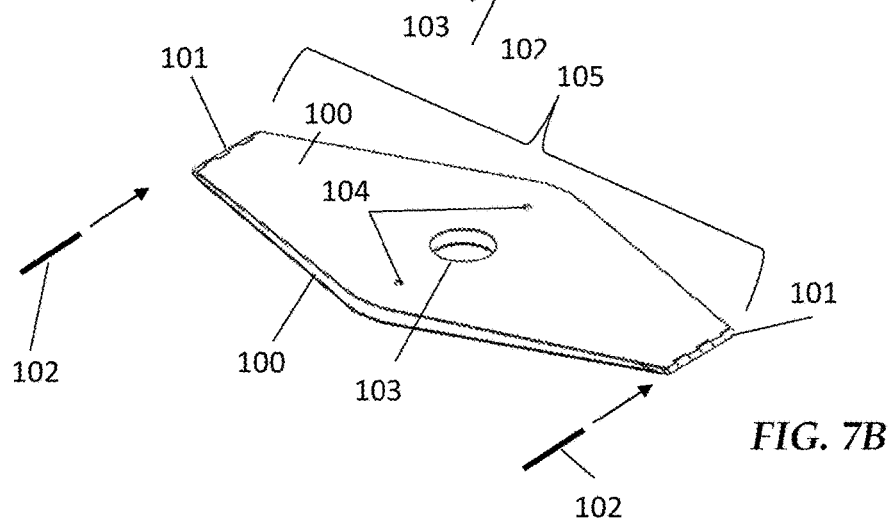
FIG. 7B shows a view of the hinged spring element set in a compressed state.

FIGS. 7A and 7B display a view of the hinged spring element set in an expanded state and a compressed state, respectively. The apparatus of the disclosure includes fabricating a set of leaf springs (using laser cutting, milling or any other fabrication means well known in the art) from a flat sheet of material 100 with a particular flat cross section (that conforms to the desired cross section or bore of the inside volume of the deployer) and forming the flat sheet into a curved element that has a known elastic spring constant. The single spring elements 100 have piano hinge elements 101 formed on two edges by bending or forming by some means well known in the art. The piano hinge elements 101 on each edge interconnect with an opposing half of another spring element 100 and a pin 102 is inserted into each of the piano hinge elements (as indicated in the illustration by an arrow) to connect the spring elements 100 together in a rotating hinge fashion. This assembly is called a hinged spring element set 105.

The flat sheet spring elements 100 also have a central access hole 103 cut in the middle of the flat sheet 100. In addition, two holes 104 are cut for rivets (or other fasteners) in each flat sheet spring elements 100 that is used to connect each hinged spring element set 105 to another hinged spring element set 105.

Figure 8:
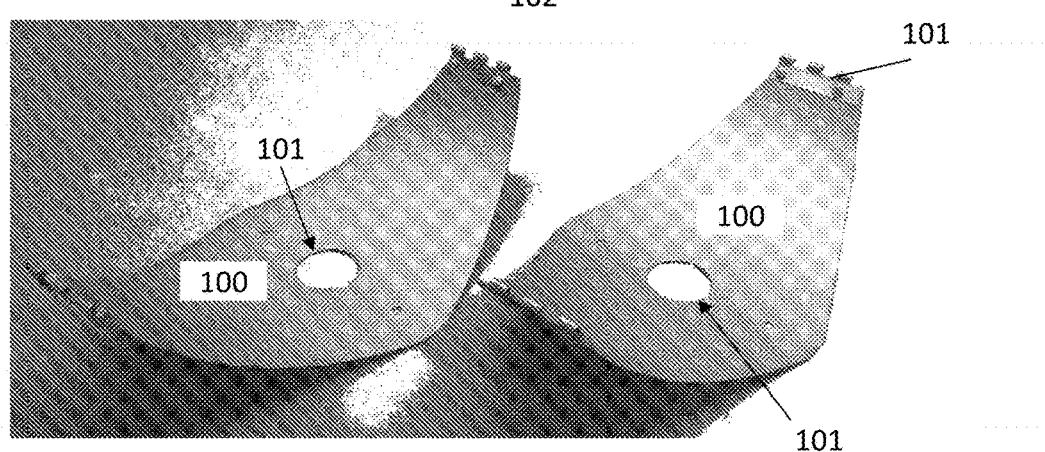
FIG. 8 depicts two separated spring portions forming the compressive strength of the presently disclosed satellite deployer spring.

FIG. 8 depicts two separated spring portions forming the compressive strength of the presently disclosed satellite deployer spring. The spring has a constant radius and constant tensile strength throughout its range of compression. The strength of the material is approximately 100,000 PSI. The thickness of the steel is about 0.022 in. However, come at the tech this may vary according to the particular application. The equation for the compression relates to the equation for cantilever beam of the material from which the spring is manufactured.

The spring is lighter in the aspect that you were getting the maximum spring use out of the stainless-steel material. A coil spring is not as efficient weight wise as this spring. The hole in the spring attaches to the plate within the compartment. This permits collapsing the spring on to the plate when the spring is not released.

The arrangement of leaf spring here in provided is an Optimal configuration. One configuration maybe to have a continuous brown spring. However, the configuration here presented provides hinges that provide for cancer screening for us across the surface area of the metal. The configuration that may also be considered is continuous trip material that would be in Ashley back-and-forth. However, the streaks from such a configuration was never sufficiently strong to support the stresses for the desired application. The accordion spring never provided sufficient load for the desired application.

If the leash for square, and you were to force it down, the spring force would not be linear. It will instead be curved. Causing greater resistance as the compression increased. A tapering the material into the diamond shape, the compression becomes a linear across the various ranges of compression. Linear in this context means that as you compress the spring, the force resistive force in the spring remains constant over the range of compression.

The shape of the leaf controls the compressive force that returns as you press down word on the spring. The diamond shape configuration of the sheet-metal causes a uniform pressure resistive pressure as the compression increases.

If the sheet metal or rectangular, for example, as the compression increased, the necessary force to compressor push down the spring would increase significantly. By virtue of having the taper and smaller surface area at the edges of the screen, the pressure necessary to compress the screen the spring remains constant across the range compression.

Thus, the force versus depression curve for the spring of the present disclosure is uniform across the range of compression. If it were a rectangle for the same dysfunction, you would have to increase the pressure substantially.

Overtime, the compression remains the same for the amount of deflection the spring. That is, the last memory of the steel metal remains relatively constant over the and continuing use of her time.

For example, whatever spring such as the one here in presented is useful, it will find appropriate application. This includes heavy equipment, such as a truck, where an axle or other compression or structure is important is the suspension of the axle can be benefited by the spring force here in the schools, this would be a practical an ideal type of spring for such an application.

The spring of the present disclosure his particular application when you have to stack of spring cells on top of one another. This provides the necessary alignment so that buckling does not occur with the screen. A coil spring, in contrast, would result in buckling of the spraying our misalignment of the spring as the spring sales or springing components were stacked on top of each other. By virtue of the design of the sheet metal hinged is here in schools, considerable amount of stacking the spring sales can be achieved without the loss of alignment that might occur with the Coral types for you. This will give a wide range of compression is maybe dessert for the given application.

In summary, here has been shown a satellite deployer spring mechanism including a satellite deployer enclosure for containing an associated column of hinged spring element sets, a substantial subset of the hinged spring element sets. A pair identically-sized leaf springs each including a sheet of curved metal formed into an approximately rhomboidal shape with opposing acute angles trimmed to form opposing parallel sides. The identically-sized leaf springs pivotally hinged at the opposing parallel sides to form a compressible and opposing pair of leaf springs as a compressible elliptical leaf spring pair. Each of the identically-sized leaf springs further including an alignment aperture at the center of the approximately rhomboidal shape for receiving a retention screw, such that the compressible elliptical leaf spring pair may receive a retention screw, thereby forming the hinged leaf spring assembly in a compressed state prior to deployment. The associated column of hinged spring element sets including a cross sectional shape conforming to the shape of the satellite deployer enclosure. A pusher plate in communication with the associated column of hinged spring element sets. A satellite in communication with the pusher plate, and a release mechanism. The satellite deployer enclosure contains the hinged leaf spring assembly that applies force without buckling to the pusher plate pushing the satellite out of the satellite deployer enclosure after the release mechanism actuation.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The detailed description set forth here, in connection with the appended drawings, is intended as a description of exemplary embodiments in which the presently disclosed subject matter may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein, but is to be accorded the widest scope consistent with the principles and novel features disclosed herein. It is contemplated that additional embodiments are within the spirit and true scope of the disclosed subject matter.

What is claimed is:

1. A satellite deployer spring mechanism, comprising:
   a satellite deployer enclosure for containing an associated column of hinged spring element sets, a substantial subset of said hinged spring element sets comprising:
   a pair identically-sized leaf springs each comprising a sheet of curved metal formed into an approximately rhomboidal shape with opposing acute angles trimmed to form opposing parallel sides;
   said identically-sized leaf springs pivotally hinged at said opposing parallel sides to form a compressible and opposing pair of leaf springs as a compressible elliptical leaf spring pair; and
   each of said identically-sized leaf springs further comprising an alignment aperture at the center of said approximately rhomboidal shape for receiving a retention screw, such that said compressible elliptical leaf spring pair may receive a retention screw, thereby forming said hinged leaf spring assembly in a compressed state prior to deployment;
   said associated column of hinged spring element sets comprising a cross sectional shape conforming to the shape of said satellite deployer enclosure;
   a pusher plate in communication with said associated column of hinged spring element sets,
   a satellite in communication with said pusher plate, and
   a release mechanism;
   where said satellite deployer enclosure contains said hinged leaf spring assembly that applies force without buckling to said pusher plate pushing said satellite out of said satellite deployer enclosure after said release mechanism actuation.

2. The satellite deployer spring mechanism of claim 1, wherein each of said hinged spring element sets provides a linear spring force from full compression to full expansion as a result of the approximately rhomboidal shape of said hinged spring element set.

3. The satellite deployer spring mechanism of claim 1, wherein said associated column of hinged spring element sets provides a long-throw linear expansion without buckling during compression.

4. The satellite deployer spring mechanism of claim 1, further comprising a pair of hinges welded to said opposing parallel sides to form a compressible and opposing pair of leaf springs as a compressible leaf spring pair.

5. The satellite deployer spring mechanism of claim 1, wherein each of said pair of hinges pivot on a hinge pin for permitting said compressible leaf spring pair to compress to a flat structure.

6. The satellite deployer spring mechanism of claim 1, wherein at least a subset of said hinged spring element sets further comprise fastening means for connecting adjacent ones of said hinged spring element sets to form said associated column of hinged spring element sets.

7. The satellite deployer spring mechanism of claim 1, wherein said retention screw is associated for removal from said associated column of hinged spring element sets prior to launching said satellite deployer enclosure.

8. A mechanical spring-based satellite deployment method for deploying a satellite from a space-based deployment system, while said space-based deployment system is in outer space, comprising the steps of:
   containing an associated column of hinged spring element sets in a satellite deployer enclosure, a substantial subset of said hinged spring element sets comprising:
   a pair identically-sized leaf springs each comprising a sheet of curved metal formed into an approximately rhomboidal shape with opposing acute angles trimmed to form opposing parallel sides;
   said identically-sized leaf springs pivotally hinged at said opposing parallel sides to form a compressible and opposing pair of leaf springs as a compressible elliptical leaf spring pair; and
   each of said identically-sized leaf springs further comprising an alignment aperture at the center of said approximately rhomboidal shape for receiving a retention screw, such that said compressible elliptical leaf spring pair may receive a retention screw, thereby forming said hinged leaf spring assembly in a compressed state prior to deployment;
   said associated column of hinged spring element sets comprising a cross sectional shape conforming to the shape of said satellite deployer enclosure;
   a pusher plate in communication with said associated column of hinged spring element sets,
   a satellite in communication with said pusher plate, and
   a release mechanism;
   where said satellite deployer enclosure contains said hinged leaf spring assembly that applies force without buckling to said pusher plate pushing said satellite out of said satellite deployer enclosure after said release mechanism actuation.

9. The mechanical spring-based satellite deployment method of claim 8, further comprising the step of providing a linear spring force from said hinged spring element sets from full compression to full expansion as a result of the approximately rhomboidal shape of said hinged spring element set.

10. The mechanical spring-based satellite deployment method of claim 8, further comprising the step of providing a long-throw linear expansion without buckling during compression using said associated column of hinged spring element sets.

11. The mechanical spring-based satellite deployment method of claim 8, further comprising the step welding a pair of hinges to said opposing parallel sides to form a compressible and opposing pair of leaf springs as a compressible leaf spring pair.

12. The mechanical spring-based satellite deployment method of claim 8, further comprising the step permitting said compressible leaf spring pair to compress to a flat structure on a hinge pin for permitting said compressible leaf spring pair to form a flat hinged spring element sets.

13. The mechanical spring-based satellite deployment method of claim 8, further comprising the step connecting adjacent ones of said hinged spring element sets to form said associated column of hinged spring element sets.

14. The mechanical spring-based satellite deployment method of claim 8, further comprising the step of removing said retention screw from said associated column of hinged spring element sets prior to launching said satellite deployer enclosure.

15. A picosatellite launching system for inexpensively launching picosatellites into outer space, comprising:
a picosatellite housing for housing at least one picosatellite to be deployed in outer space; and
a satellite deployer spring mechanism for launching a picosatellite from said picosatellite housing, said satellite deployer enclosure comprising:
a satellite deployer enclosure for containing an associated column of hinged spring element sets, a substantial subset of said hinged spring element sets comprising:
a pair identically-sized leaf springs each comprising a sheet of curved metal formed into an approximately rhomboidal shape with opposing acute angles trimmed to form opposing parallel sides;
said identically-sized leaf springs pivotally hinged at said opposing parallel sides to form a compressible and opposing pair of leaf springs as a compressible elliptical leaf spring pair; and
each of said identically-sized leaf springs further comprising an alignment aperture at the center of said approximately rhomboidal shape for receiving a retention screw, such that said compressible elliptical leaf spring pair may receive a retention screw, thereby forming said hinged leaf spring assembly in a compressed state prior to deployment;
said associated column of hinged spring element sets comprising a cross sectional shape conforming to the shape of said satellite deployer enclosure;
a pusher plate in communication with said associated column of hinged spring element sets,
a satellite in communication with said pusher plate, and
a release mechanism;
where said satellite deployer enclosure contains said hinged leaf spring assembly that applies force without buckling to said pusher plate pushing said satellite out of said satellite deployer enclosure after said release mechanism actuation.

16. The picosatellite launching system comprising said satellite deployer spring mechanism of claim 15, wherein each of said hinged spring element sets provides a linear spring force from full compression to full expansion as a result of the approximately rhomboidal shape of said hinged spring element set.

17. The picosatellite launching system comprising said satellite deployer spring mechanism of claim 15, wherein said associated column of hinged spring element sets provides a long-throw linear expansion without buckling during compression.

18. The picosatellite launching system comprising said satellite deployer spring mechanism of claim 15, further comprising a pair of hinges welded to said opposing parallel sides to form a compressible and opposing pair of leaf springs as a compressible leaf spring pair.

19. The picosatellite launching system comprising said satellite deployer spring mechanism of claim 15, wherein each of said pair of hinges pivot on a hinge pin for permitting said compressible leaf spring pair to compress to a flat structure.

20. The picosatellite launching system comprising said satellite deployer spring mechanism of claim 15, wherein at least a subset of said hinged spring element sets further comprise fastening means for connecting adjacent ones of said hinged spring element sets to form said associated column of hinged spring element sets.

* * * * *

UNITED STATES PATENT AND TRADEMARK OFFICE
CERTIFICATE OF CORRECTION

PATENT NO. : 10,370,124 B2
APPLICATION NO. : 15/791069
DATED : August 6, 2019
INVENTOR(S) : Victor James Dube Page 1 of 1

It is certified that error appears in the above-identified patent and that said Letters Patent is hereby corrected as shown below:

In the Specification

Column 1, Line 5, after the title and before CROSS-REFERENCE TO RELATED APPLICATIONS: Insert the following:
--This invention was made with Government support under N68335-17-C-0506 awarded by the Department of the Navy. The Government has certain rights in this invention.--.

Signed and Sealed this
Thirty-first Day of March, 2020

Andrei Iancu
*Director of the United States Patent and Trademark Office*